United States Patent Office 3,141,595
Patented July 21, 1964

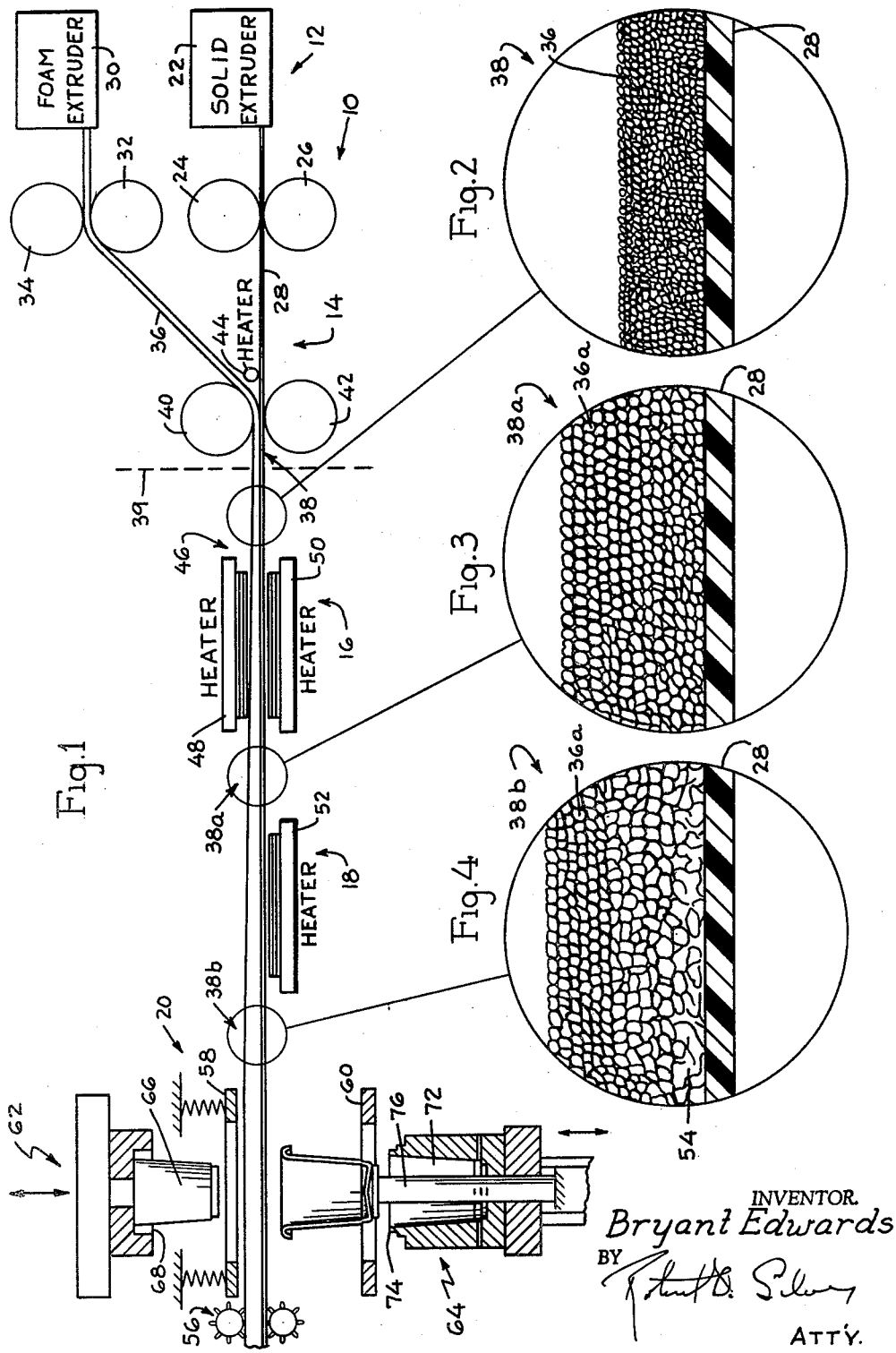

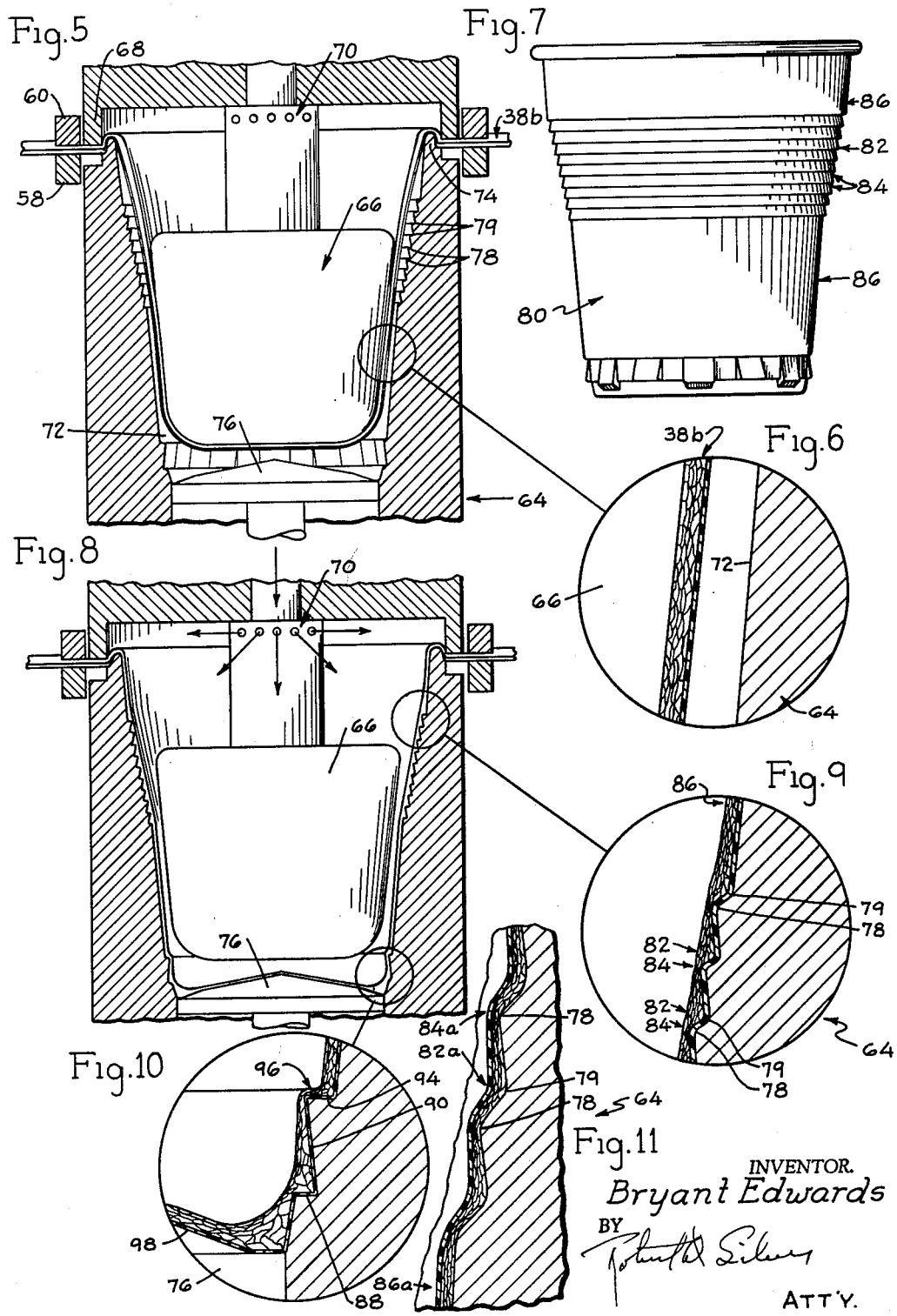

3,141,595
CONTAINER
Bryant Edwards, Clarendon Hills, Ill., assignor to Illinois Tool Works Inc., Chicago, Ill., a corporation of Delaware
Filed July 20, 1962, Ser. No. 211,348
6 Claims. (Cl. 229—1.5)

This invention relates in general to containers, and more particularly relates to plastic containers which are of the thin wall variety and the materials and methods by which the container is made.

It has long been desired to have an economical plastic container for use with hot beverages, foods, etc., and of the type wherein the user is not subjected to discomfort from heat transfer of the hot beverage or other items disposed in the container.

It is therefore the general object of this invention to provide a plastic container which, when filled with hot beverages, may be manually grasped without discomfort to the user while drinking from or carrying the container.

Another object of this invention is to provide an economical plastic container of the aforementioned type which may be stacked and readily dispensed from a vending machine, being comparable in weight to present cup designs.

It is another object of this invention to provide a unitary plastic container which is unaffected by humidity and thus is dimensionally stable for easy vending thereof, is uniform in size when manufactured by mass production techniques, and is otherwise well adapted to be automatically vended from the vending machines now in use.

It is another object of this invention to provide a container as above-described which is strong per unit weight, has no seams to disintegrate when filled with a hot beverage, and has a configuration affording insulating characteristics such that it may be readily held by the user when the temperature of the beverages or other items disposed within the container are well above the temperature that the human hand can normally withstand.

It is a further object of this invention to provide a novel container, as set forth above, which protects the table surfaces, etc., from heat transfer, and additionally the very low moisture vapor transmission of the material from which the container is made protects the table surfaces etc. from marking by the beverages contained therewithin.

Still another object of this invention is to provide a container comparable in weight to containers heretofore known, said container being made from laminated high density material and foam material wherein the foam material affords a greatly increased thickness of the container in the area normally grasped by the user to thereby insulate the user from the temperature of the contents in the container without increasing the thickness of the entire article across its entire extent.

It is still another object of this invention to provide a container as aforedescribed wherein two dissimilar densities of material of substantially identical chemical composition are laminated together and formed in a forming machine in a manner such that the laminate in the finished container has a greater cross sectional thickness in the area normally grasped by the user, the increased thickness in no way impairing the vending qualities of the container.

It is a further object of this invention to provide a novel method of laminating foam plastic material to high density plastic material, expanding the foam portion of the laminate in a manner to rupture some of the foam cells immediately adjacent to the high density layer of the laminate, and then by suitable machinery trap the gas liberated by the rupturing of the cells so as to place the trapped gas in certain portions of the finally formed container that are normally grasped by the user so as to increase the effective thickness of the container at those portions which are normally grasped.

It is a further object of this invention to provide a container forming method wherein the material of laminated form is of such characteristics that the scrap from the molding machine may be readily re-ground and reconstituted for use in extruder machines, the laminate materials having similar chemical characteristics but differing densities.

A still further object of this invention is to provide an apparatus for laminating together foam sheet material and high density sheet material and then providing additional heating means so arranged and located so as to raise the temperature of the laminate in such a manner as to rupture the foam cells immediately adjacent to the high density layer to thereby allow the disposition of the gas that is liberated into preselected locations in the final forming of the container in a forming machine.

Other objects and advantages of the present invention will appear in the following description of the accompanying drawings wherein:

FIG. 1 is a semidiagrammatic view of an apparatus for molding an insulated container of the type shown in FIG. 7;

FIG. 2 is a greatly enlarged sectional view of a portion of the laminated sheet as indicated by the circle in FIG. 1;

FIG. 3 is a view similar to FIG. 2 showing a sectional view of the laminated sheet after it has passed through the first heating means, said view being taken as indicated by a circle in FIG. 1;

FIG. 4 is a view similar to FIGS. 2 and 3 showing a greatly enlarged sectional view of still another portion of the laminated sheet after it is passed by the final heating means as indicated by the circle in FIG. 1;

FIG. 5 is a sectional view somewhat semidiagrammatic in form showing the laminated material in the forming apparatus prior to the creation of pressure differential across the sheet;

FIG. 6 is a greatly enlarged sectional view of the laminate at the indicated portion of FIG. 5;

FIG. 7 is an elevational view of an insulated container formed by the techniques shown in the remaining figures;

FIG. 8 is a view similar to FIG. 5 showing the disposition of the laminate material after the imposition of a pressure differential across the laminate sheet;

FIG. 9 is an enlarged sectional view of the indicated portion of the container formed in the mold as indicated in FIG. 8;

FIG. 10 is an enlarged fragmentary sectional view of the lower right hand corner portion of the container as indicated in FIG. 8; and FIG. 11 is a view of the laminated sheet and the container side wall so formed when the laminated material is fed to the forming apparatus in reverse position to that shown and discussed in the foregoing figures, said view being an enlarged fragmentary sectional view of an area similar to that shown in FIG. 9.

Before discussing the invention in detail, some general background would appear beneficial. Plastic containers have begun to come into general use with automatic vending machines and (particularly when associated with hot beverages such as coffee, soup, etc.) present a handling or holding problem to the user when the beverage is served hot. Most plastics used in manufacturing these containers have fairly good insulating characteristics per unit thickness when compared with other materials. However, in the interests of economical manufacture of plastic containers to compete successfully with other materials, relatively thin walls are required. This obtains since raw plastic material is uniformly sold on a per pound basis and increasing the amount or thickness of the material to increase the insulating quality would merely increase the unit price of a plastic container to make it noncompetitive. One approach to the problem has been to try to extend the plastic material by "foaming," i.e., creating bubbles of gas in the plastic material and manufacturing a container of such foam material. However, foamed materials as such, while light in weight, and economical in total amount of material used, normally have to be made "too thick" for ready nestability of a plurality of containers one within the other while is required for shipping a large volume of containers from the manufacturing plant to users. Further, foam material containers dent very easily, do not provide the hard glossy surface often desired by the user, and often do not have the required mechanical strength per unit thickness. Also, difficulties are often encountered in heating and precisely handling foam material in forming. Heretofore, it has been difficult to sheet form a foam sheet in high speed automatic forming machinery. Thus, containers formed from straight foamed materials have not come into wide spread commercial usage.

This invention deals with a laminate of foam material with high density material. The laminate preserves the advantages of both types of materials and by the techniques to be discussed has some special advantages. One major advantage to the laminate is that it may be handled by "sheeting forming" techniques.

In the instant application there is disclosed in semidiagrammatic form a shet forming technique which may be characterized as being a combination of mechanical plug assist and pressure differential. While the instant invention has special advantages when made through the use of a mechanical plug assist and pressure differential technique, it will be appreciated that it also has advantages relative to the other sheet forming techniques now in use such as vacuum forming, blow forming, drape forming, snap back forming and the various modifications thereof. As shall become apparent, the teachings of the instant technique have application in any forming machinery of the sheet forming type which utilizes a clamp means.

As shown in FIG. 1, the apparatus 10 utilizable to practice the method of forming an insulated container may comprise extruder means station 12, a laminating station 14, a first heater station 16, a second heater station 18, and a forming apparatus station 20. There is appropriate means 56 for transporting the laminated sheet between stations.

At the extruder means station 12 is a first extruder 22 denominated as a solid extruder which may be of any suitable and conventional type which is adapted to extrude plastic material in sheet form and of desired width and thickness. As the material is extruded from the extruder 22, it passes through suitable forming rolls 24 and 26 and comes out as a flat sheet 28. One particular plastic material for sheet 28 is high impact polystyrene sheet having a density of approximately 63 pounds per cu. ft. and a thickness of about .026 inch. The second extruder means 30 shown diagrammatically as a foam extruder is also located at the extruder means station 12 and is adapted to extrude a foam sheet 36 which passes through suitable forming rolls 32 and 34. The foam sheet 36 is preferably a low density polystyrene having a density of approximately 6 to 10 pounds per cu. ft. and having an initial thickness of approximately .060 inch. While both extruders 22 and 30 are shown extruding and will be discussed in terms of extruding a polystyrene sheet material, it is to be remembered that the instant invention may be practiced with other different plastic materials having a similar chemical composition to each other which have both a high density sheet form and a second form which may be extended in such a manner as to form foam cells. After the sheets 28 and 36 are extruded and have passed by their respective forming rolls, they may be preferably laminated at the laminating station 14 by passing between suitable rolls 40 and 42. A heater 44 may be disposed between the two sheets just immediately before entering the laminating station to provide sufficient heat for good bonding lamination of the two sheets, if the heat of the individual sheets as they come from their respective extruders is not sufficient to cause a good bonding relation therebetween.

The laminate material 38 emanating from the laminating station 14 is shown in a greatly enlarged cross sectional view in FIG. 2. The relative dimensions aforediscussed relative to the two individual sheets 28 and 36 making up the laminate 38 are shown in FIG. 2, but it is to be remembered that these dimensions are to be considered illustrative rather than limiting.

As the laminate 38 is moved from between the rolls 42 and 40, it may be either stored in storage rolls or may be passed directly into the forming machinery. The dotted line 39 indicates where the storage roll take off would be placed if it is desired not to connect the extruders directly to the forming machinery. As the laminate 38 is moved by transporting means 56 toward the forming machinery, it passes through the first heating station 16. It is preferred that this heating station comprise upper and lower heaters 48 and 50, each of which may be a flame heater, electrical heater, or infrared heat as suitable and desired. The heaters 48 and 50 above and below the sheet laminate 38 are coordinated with the means 56 passing the sheet therebetween in such a manner that the amount of heat absorbed by the laminate 38 is sufficient to raise the temperature of both sides of the laminate, i.e., portions 28 and 36 to the so called "forming temperature" of the foam portion 36 of the laminate. For the materials being discussed, i.e., the polystyrene, the forming temperature of the foam sheet 36 is in the neighborhood of 215° F. By heating the laminate to 215° F., the laminate increases its thickness, the material 36 expanding and becomes material 36a (see FIG. 3). The heat at station 16 causes the expansion of the gas in the foam cells of material 36, the gas usually being air, so as to expand sheet 36 from its initial thickness of approximately .060 inch to a dimension of approximately .090 inch, the dimensions of the high density styrene sheet 28 remaining approximately the same. As the sheet transporting means 56 continues to pass the material toward the forming machinery, it passes by a second heating station 18. It will be apparent that the second heating station 18 may be made integral with the first heating station 16, assuming that the heat applying means is so arranged and configured as to provide the net effect about to be discussed. The second heating station has a heater 52 disposed relative to the laminate so that it heats the laminate 38 only from the side of the high density material 28. The heater 52 is so arranged relative to the movement of the sheet that the temperature of the sheet portion 28 of the laminate is raised to its forming temperature in the neighborhood of 250° F. By the application of additional heat at the heating station 18 from the solid sheet side of the laminate, the migration of heat through the sheet 28 portion of the laminate 38a causes a rupture of the foam cells immediately adjacent to sheet 28. The ruptured foam cells are shown at 54 in FIG. 4. Due to the rupture of the individual cells immediately adjacent to sheet 28, the laminate 38a effectively becomes a three layer laminate 38b. The laminate 38b shown in cross section in FIG. 4 now has the high density sheet material 28, a layer of ruptured cells 54 and the nonruptured expanded cells 36a.

Due to the rupturing of the foam cell walls immediately adjacent to the boundary with sheet 28, there is migration freedom for the gaseous material normally within the foam cells along the plane of the initial boundary of sheet 36a and sheet 28. Since the outer cells 36a have not been ruptured and due to the fact that sheet 28 is not ruptured, the relatively free movement of air between the two layers is trapped therebetween. Since it is conventional not to heat the extreme edges of the sheet for purposes of transporting, the air is effectively prevented from escaping from between layer 36a and layer 28. The three layer laminate 38b has structural integrity because the ruptured portions of the foam cells still tend to adhere to the two sheets preventing complete separation. Material 38b now passes to the forming machinery for molding into desired form.

As the laminate 38b is moved into the forming area of the forming machinery, it is preferably handled in such a manner that it is firmly clamped between upper and lower clamp means 58 and 60, which are associated with upper mold means 62 and lower mold means 64 respectively. It will be realized that while just a single cavity mold and clamp means are being discussed, multiple mold means are in fact contemplated, and the disclosure of the mold means is to be considered semidiagrammatic only. In the instant forming machinery, the upper mold means 62 comprises a male plug member 66 having a sealing cut-off edge 68 surrounding the upper end thereof for coaction with the lip 74 of the lower mold means 64 as shall become apparent. Means for creating a pressure differential 70 is here shown as positive air pressure outlets which are associated with the upper mold means 62; however, it will be realized that negative pressures or vacuum outlets associated with the lower mold means are equally contemplated. The lower mold means 64 comprises a molding cavity 72 having an upper sealing cut-off lip portion 74 and a relatively movable knock-out plug 76. The upper lip 74 coacts with portion 68 of the upper mold means as shown in FIGS. 5 and 8 to first sealingly engage the laminate material around the molding cavity and then later to act as a cut-off if this is desired. The molding cavity 72 is formed with a plurality of rings intermediate the height of the cavity to provide radially inward projections 78 and grooves or radially outward projections 79. These are shown in enlarged detail in FIG. 9. The edges of the projection 78 and grooves 79 may be slightly rounded for manufacturing convenience purposes. It will be noted that the areas of the side walls joining the extremes of the projections 78 and 79 have a back taper.

The steps of the forming process essentially comprise the clamping of the material 38b between the annular clamping means 58 and 60 and thus isolating the clamped area from the nonclamped area, mechanically prestretching the laminate 38b with the plug 66 until it reaches the position shown in FIG. 5, then creating a pressure differential across the web as by putting air under positive pressure through the apertures 70 in the plug 66 to cause the material to expand to engage with the chilled cavity 72 having the projection 78 and grooves 79 therein. The material then "sets" in its formed shape whereupon the mold means 62 and 64 have further movement such that lip 74 and the edge 68 cut off the remaining material to make an article 80 such as shown in FIG. 7. The knock-out plug 76 then removes the article 80 from the mold and new material 38b is automatically moved between the clamp means and the molding sequence continues.

Of particular note is the configuration of the side wall 86 of the container 80 after it has been forced by the pressure differential into engagement with the inward and outward projections 78 and 79 in the molding cavity. It will be noted that the thickness of the walls of the container is not uniform as shown in enlarged section in FIG. 9. As aforementioned, the area 54 immediately adjacent the common boundary of the two portions of the heated laminate 38b has gaseous material which is free to migrate. The gas in area 54 cannot escape from the forming area because of the clamp means 58 and 60. Thus, the radially inner projections 78 of the mold when the material 38b is forced by the pressure differential into engagement therewith causes annular pockets between the projections preventing free migration of the trapped gas. As the material of the laminate 38b engages any two axially spaced annular projections 78, the air or gas in the ruptured layer of cells 54 is trapped between the two spaced projections. The radially outward pressure being exerted by the pressure differential means 70 is resisted by this trapped air of layer 54 between the projections with a resilient back pressure. This in turn causes the radially outermost material 28 of the laminate 38b to fill out the radially outermost projections 79. The net effect of this is that the material in the side walls 86 of the container 80 formed by the radially outward projections 79 becomes thicker at 82 than the rest of the container and considerably thicker than the portions 84 adjacent to the inward projections 78. It has been ascertained by direct measurement that the thickness of the side walls of the container at the portions indicated with the arrow 82 exceed twice the thickness of the material at portions 84. Also the thickness of the side walls at 82 is more than twice the thickness of the lower portion of the side walls 86 below the series of rings. The thickness of the side walls of portion 82 in the finally formed container 80 made as aforediscussed is in the vicinity of .0290 inch, portion 84 is in the vicinity of .0130 inch, and the side walls 86 below the rings is in the vicinity of .0125 inch. This construction greatly aids the user grasping the side wall of the container by insulating the user from the contents of the container. Since the user contacts the outer side walls only at portions 82 formed by the grooves 79, the user is insulated from the exterior by the increased thickness of material. However, this location of the increased thickness of material at these predetermined points 82 on the side walls of the container does not adversely affect the nesting capabilities of the container.

As stated earlier, it is necessary and desirable that the insulating containers be vendable and thus require close nesting. To this end, shoulder means 88 (shown in FIG. 10) is cooperable with an inside shoulder means 96 formed by angularly offset portions 90 and 94 on the next adjacent cup to provide a stacking height for nesting of adjacent containers without jamming. Shoulder 88 while here shown spaced from the bottom wall 98 of the container may be, if desired, placed on this bottom surface. It is important in forming an article of this type that shoulder 94 be made of greater radial extent than is usually necessary. This radial extent of shoulder 94 causes a reduction of the thickness of the foam portion of the plastic material to provide an internal shoulder 96 for cooperation with outside shoulder 88, i.e., the greater horizontal extent of portion 94 causes the foam material of the laminate to be relatively thin at that point disposed in immediately vertically spaced relation to outer shoulder portion 88. It will be realized that, as shown in FIG. 10, all of the corner areas tend to be filled out by virtue of the same effect that takes place in the side walls adjacent to projections 78 and 79, this construction having the added additional benefit that a user grasping the container adjacent the bottom is benefited by the greater insulating or thermal capacity in this area.

It will be particularly noted that the desirable effects of this invention are most greatly enhanced when the laminate 38b is so disposed to the mold means that the portion 28 of the laminate 38b engages the projecting surfaces 78 first. When the reverse procedure is used, i.e., the sheet 38b is fed to the mold means so that the foam engages projections 78 first, the result is as shown in FIG. 11. While there is an increase in the thickness of the material 82a adjacent to the outward projections 79 (as shown in FIG. 11) and portion 84a is thinner than portion 82a, the effect is not as great, the difference in thickness being in the neighborhood of one and one-half times. This while effective for insulating purposes is not as beneficial in this regard as the construction shown in FIG. 9.

Although specific embodiments of the invention have been shown and described, it is with full awareness that many modifications thereof are possible. The invention is thus not to be restricted except in so far as is necessitated by the prior art and by the spirit of the appended claims.

What is claimed as the invention is:

1. A one piece sheet formed container comprising a hollow member having a bottom wall and side wall extending upwardly therefrom to form an open top, said container being characterized in that a cross section of said side wall of the container exposes a first portion having a predetermined thickness and a relatively smooth uninterrupted radially inward and radially outward surface, said side wall having a second portion having relatively smooth radially inward surface and having a radially outward surface having a plurality of closely spaced radially outwardly projecting portions integral therewith, said projecting portions at their greatest radial extent providing an increased thickness of the side wall of the container as compared to said predetermined thickness and the user who grasps said side wall of the container by the projecting portions is separated from the contents of the interior of the container by the increased thickness of said projections.

2. An integral one piece plastic container formed from a laminated sheet of foam plastic sheet and solid plastic sheet material of similar chemical composition and substantially differing densities having a bottom wall and side wall extending upwardly and outwardly from the bottom wall to define a substantially open mouth, said side wall being characterized as providing a plurality of radial interruptions to define radially outward projections spaced from each other a distance sufficiently small so that they are normally contacted by a user when gripping said container, said side wall being further characterized in that the cross sectional thickness of the solid plastic portion of the laminate is substantially invariant throughout the side wall and the foam plastic portion of the laminate has a substantially greater cross section thickness in the area of said projections, whereby a user grasping said projections is thermally protected from the contents of the container by a substantially greater amount as compared to grasping the side wall of the container in an area having no projections.

3. A one piece thin walled plastic laminated sheet formed container having two bonded materials of similar chemical composition and different densities comprising a hollow member having a bottom wall and side wall extending upwardly therefrom to form an open top, said container being characterized in that a cross section of a side wall of the container exposes a first portion having a predetermined relatively uniform overall thickness with a first subportion of a first thickness and a second subportion of a second thickness, said first portion presenting a relatively smooth uninterrupted radially inward and radially outward surface, said side wall having a second portion comprised of third and fourth subportions, said second portion having a varying overall thickness, said third subportion having a thickness substantially the same over the entire second portion, the thickness of said fourth subportion varying widely over the second portion, said second portion presenting a relatively smooth radially inward surface and having a radially outward surface having a plurality of closely spaced outwardly projecting portions integral therewith, said projecting portions at their greatest radial extent providing an increased thickness of the side wall of the container as compared to said predetermined thickness, whereby the user who grasps said side wall of the container by the projecting portions is separated from the contents of the interior of the container by the thickness of said projections.

4. An insulated plastic cup formed from laminated foam sheet and solid sheet material characterized as being essentially of the thin wall variety having a bottom wall, side wall, and an open mouth, said side wall being characterized as having a series of radial areas of relatively small axial height wherein the cross sectional thickness of the laminate is alternately thickened and thinned, the thicker areas projecting radially a greater distance than the adjacent thinner areas, whereby a user may comfortably grasp the container when filled with contents having a great temperature differential relative to ambient temperature.

5. The cup set forth in claim 4 wherein the thicker area exceeds the thinner area by a factor of 1.5.

6. The cup set forth in claim 4 wherein the thicker area exceeds the thinner area by a factor of 2.

References Cited in the file of this patent

UNITED STATES PATENTS

| | | |
|---|---|---|
| 2,891,280 | Politis | June 23, 1959 |
| 2,905,350 | Edwards | Sept. 22, 1959 |
| 2,917,217 | Sisson | Dec. 15, 1959 |
| 2,942,301 | Price et al. | June 28, 1960 |
| 2,962,758 | Politis | Dec. 6, 1960 |